United States Patent
Wilt et al.

(10) Patent No.: US 10,124,765 B2
(45) Date of Patent: Nov. 13, 2018

(54) KEYPAD MASTER CODE

(71) Applicant: Ford Global Technologies, LLC, Dearborn, MI (US)

(72) Inventors: Matthew Wilt, South Rockwood, MI (US); Brandon M. Dawson, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/385,012

(22) Filed: Dec. 20, 2016

(65) Prior Publication Data
US 2018/0170311 A1    Jun. 21, 2018

(51) Int. Cl.
*B60R 25/20* (2013.01)
*H04B 1/3822* (2015.01)
*H04W 4/04* (2009.01)
*B60R 25/24* (2013.01)
*H04W 4/029* (2018.01)

(52) U.S. Cl.
CPC .......... *B60R 25/2018* (2013.01); *B60R 25/24* (2013.01); *H04B 1/3822* (2013.01); *H04W 4/029* (2018.02); *H04W 4/046* (2013.01)

(58) Field of Classification Search
CPC ... B60R 25/2018; B60R 25/24; H04B 1/3822; H04W 4/028; H04W 4/046
USPC ....................................................... 340/5.22
See application file for complete search history.

(56) References Cited

U.S. PATENT DOCUMENTS

| | | | |
|---|---|---|---|
| 4,494,114 A | 6/1985 | Kaish | |
| 5,021,776 A * | 6/1991 | Anderson | .......... G07C 9/00142 235/382 |
| 5,635,901 A | 6/1997 | Weinblatt | |
| 5,821,631 A * | 10/1998 | Loraas | .................... B60R 25/04 340/5.3 |
| 6,018,291 A * | 1/2000 | Marble | ................... B60R 25/04 180/287 |
| 6,606,492 B1 * | 8/2003 | Losey | ..................... B60R 25/04 307/10.2 |

(Continued)

FOREIGN PATENT DOCUMENTS

| | | |
|---|---|---|
| CN | 102393888 B | 4/2015 |
| CN | 105799645 A | 7/2016 |

(Continued)

OTHER PUBLICATIONS

Remote Keyless Entry, http://machenry.com/documents/KeypadOwnGuide.pdf (5 pages), document created Jun. 19, 2003.

(Continued)

*Primary Examiner* — Hirdepal Singh
(74) *Attorney, Agent, or Firm* — Frank A. MacKenzie; Bejin Bieneman PLC

(57) ABSTRACT

A vehicle keypad lock control system includes a computer programmed to determine whether the keypad master code should be deactivated based at least on data received by or stored on the computer. The computer deactivates the keypad master code in response to a determination that the keypad master code should be deactivated. The computer may actuate the power lock to an unlocked condition in response to receiving keypad data including the keypad master code while the keypad master code is activated.

16 Claims, 4 Drawing Sheets

(56) References Cited

U.S. PATENT DOCUMENTS

| | | | |
|---|---|---|---|
| 6,828,694 B2 | 12/2004 | Flick | |
| 6,960,990 B2* | 11/2005 | McKibbon | B60R 25/04 180/287 |
| 8,154,383 B2 | 4/2012 | Brombach et al. | |
| 8,957,757 B1* | 2/2015 | Le Burge | G07C 9/00007 340/5.54 |
| 2004/0051631 A1* | 3/2004 | Metlitzky | B60R 25/04 340/426.11 |
| 2005/0190040 A1* | 9/2005 | Huntzicker | B60R 1/12 340/5.54 |
| 2005/0212653 A1* | 9/2005 | Hertel | B60R 25/022 340/5.22 |
| 2006/0138863 A1* | 6/2006 | Jones | B60R 25/04 307/10.1 |
| 2006/0255906 A1* | 11/2006 | Ghabra | B60R 25/24 340/5.25 |
| 2011/0187496 A1* | 8/2011 | Denison | G07C 9/00571 340/5.53 |
| 2013/0120110 A1* | 5/2013 | Kalous | G05B 1/01 340/5.54 |
| 2015/0102898 A1* | 4/2015 | Huennekens | G07C 9/00111 340/5.6 |
| 2015/0294518 A1* | 10/2015 | Peplin | B60R 25/23 340/5.22 |
| 2016/0049033 A1* | 2/2016 | Sigal | B60R 25/24 340/5.61 |
| 2016/0059825 A1 | 3/2016 | Coombs | |
| 2016/0247339 A1 | 8/2016 | Miller | |
| 2017/0072908 A1* | 3/2017 | Liubakka | B60R 25/23 |

FOREIGN PATENT DOCUMENTS

| | | | | |
|---|---|---|---|---|
| FR | 2774121 B1 | | 4/2000 | |
| GB | 2520918 A | * | 6/2015 | B60R 25/23 |
| JP | 2001073604 A | | 3/2001 | |

OTHER PUBLICATIONS

SecuriCode Keyless Entry Keypad—Vehicle Features—Official Lincoln Owner Site, https://owner.lincoln.com/how-tos/vehicle-features/locks-and-security/securicode-keylessentry-keypad.html (7 pages), document accessed before Sep. 30, 2016.

GB Search Report dated Jun. 20, 2018 re: GB Appl. No. 1721281.2.

* cited by examiner

KEYPAD MASTER CODE

BACKGROUND

Vehicles are equipped with locking mechanisms that actuate between a locked and unlocked state in response to a unique key, wireless communication, security code, etc. The wireless communication may come from a key fob, cell tower, etc. The security code may be entered into a keypad located on the vehicle.

Vehicles are initially manufactured, tested, and stored awaiting transport for sale in large numbers. The unique key, wireless communication, security code, etc., for each vehicle of the large number of vehicles allows access to that vehicle.

DETAILED DESCRIPTION

Introduction

Figure 1:
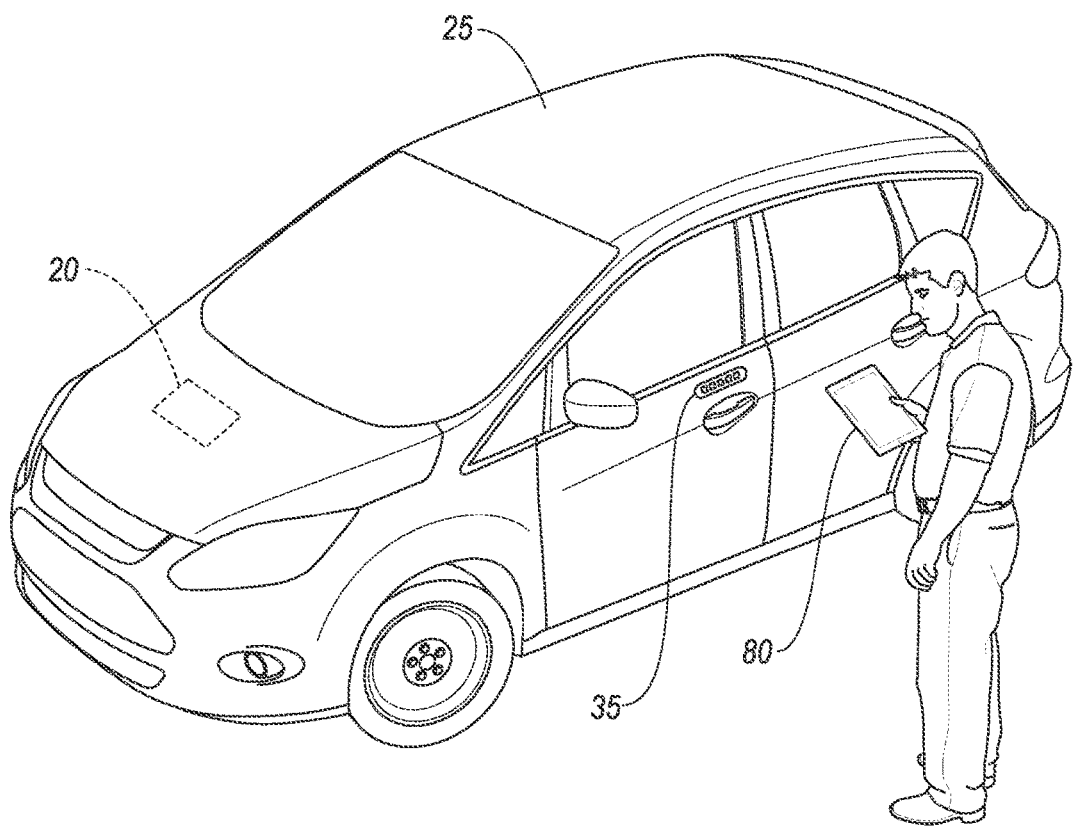
FIG. 1 is a perspective view of an example vehicle having an example keypad lock control system.

A keypad lock control system 20 (see FIGS. 1 and 2) provides a hardware and software infrastructure to allow, or inhibit, access to an interior of a vehicle 25, without the need for a unique security code for the vehicle 25. Access, or inhibition of such access, to the vehicle 25 is provided by activating or deactivating a keypad master code, i.e., a common code across numerous vehicles, such as all vehicles of a certain make and/or model during a production year, for an external keypad 35 controlling a power lock 45 of the vehicle 25. Accordingly, a computer 70 of the system 20 in the vehicle 25 is programmed to determine whether the keypad master code should be deactivated based at least on data received by or stored on the computer 70. The computer 70 deactivates the keypad master code in response to a determination that the keypad master code should be deactivated.

The computer 70 may determine whether the keypad master code should be deactivated based at least on an identified location of the vehicle 25, distance driven by the vehicle 25, and/or mode of the vehicle 25. The computer 70 may actuate the power lock 45 to an unlocked condition in response to receiving keypad data including the keypad master code while the keypad master code is activated.

System

Figure 2:
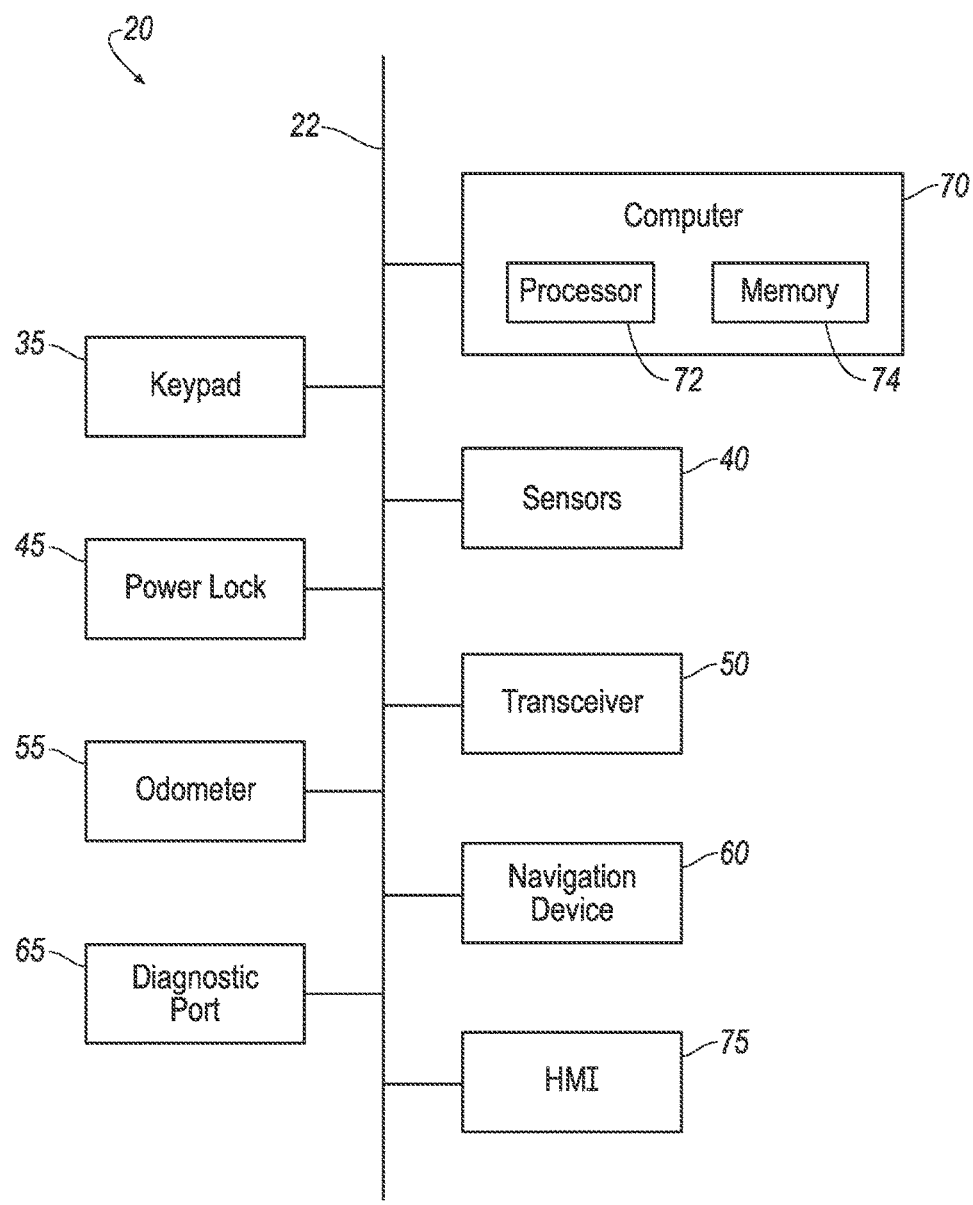
FIG. 2 is a block diagram of components of the example keypad lock control system of FIG. 1.

As shown in FIGS. 1 and 2, a keypad lock control system 20 includes an electronic keypad 35, one or more sensors 40, a power lock 45, a transceiver 50, an odometer 55, a navigation device 60, and a diagnostic port 65, all in communication with a computer 70.

The keypad 35 is in communication with the computer 70 via a vehicle bus or network 22. The keypad 35 includes multiple buttons, or other similar user input device, such as a touch sensitive pad or display with distinct areas of input, for a user to press. For example, the touch sensitive pad or display may have buttons that are distinct areas defined by a grid, number or other indication displayed thereon. Pressing of one of the buttons by the user causes the keypad 35 to send keypad data to the computer 70 indicating that the button was pressed. The keypad data may include identifying information such that the computer 70 may identify which of the buttons was pressed. For example, the buttons may be labeled with a unique identifier, such as an Arabic number. For example, pressing a button labeled "1" causes the keypad 35 to send keypad data to the computer 70 indicating that the button labeled "1" was pressed. Similarly, pressing buttons in a specific order, e.g., "1-3-5-2," causes the keypad 35 to send keypad data indicating that the buttons labeled "1-3-5-2" were pressed in such an order.

The sensors 40, which are implemented via circuits, chips, or other electronic components, collect and send data to the computer 70. The sensors 40 are in communication with the computer 70 via the vehicle bus or network 22. The sensors 40 may detect the position of the vehicle 25, for example, global positioning system (GPS) sensors. The sensors 40 may detect a speed or distance traveled by the vehicle 25.

The power lock 45 is in communication with the computer 70 via the vehicle bus or network 22. The power lock 45 controls a locking mechanism in one or more doors of the vehicle, such as by using an electro-mechanical locking system. For example, the power lock 45 may include an actuator that moves a latch of the power lock 45. The actuator and latch may be mounted in one of the doors of the vehicle 25. In a first position, e.g., a locked position, the latch may prevent the door from opening. In a second position, e.g., an unlocked position, the latch may permit the door to be opened. The actuator may move the latch between the first and second positions in response to a command sent from the computer 70. The power lock 45 may include an actuator and latch in each door of the vehicle. When the doors of the vehicle 25 are locked, actuation of the power lock 45 may unlock a single door of the vehicle 25, such as a driver door, or it may unlock all doors of the vehicle 25. When the doors of the vehicle 25 are unlocked, actuation of the power lock 45 may lock one or more doors of the vehicle 25.

The transceiver 50 is in communication with the computer 70 via the vehicle bus or network 22. The transceiver 50 is implemented via antennas, circuits, chips, or other electronic components that can facilitate wireless communication. The transceiver 50 transmits and receives information wirelessly from other transceivers, enabling signals, data and other information to be exchanged with other computer and network systems, such as a secondary computing device 80. Example transceivers 50 include Wi-Fi systems, radio transmitters and receivers, telecommunications systems, Bluetooth® systems, cellular systems and mobile satellite transceivers.

The odometer 55 is in communication with the computer 70 via the vehicle bus or network 22. The odometer 55 tracks the total number of miles (or kilometers) the vehicle 25 has driven since its initial manufacture. The odometer 55 may be a computing device that may include circuits, chips, or other electronic components. The odometer 55 may utilize a sensor 40, such as a magnetic sensor, that detects pulses generated from teeth of a toothed wheel passing by the sensor 40. The toothed wheel may be mounted on an output of a transmission of the vehicle 25. The number of pulses may be correlated programmed in with an amount of rotations of the output of the transmission, and the number of rotations correlated with a distance driven, such as by the odometer 55, or computer 70, being programmed with a correlation equation or look up table.

The navigation device 60 is a computing device that is implemented via circuits, chips, or other electronic components. The navigation device 60 is in communication with the computer 70 via the vehicle bus or network 22. The navigation device 60 determines a location of the vehicle 25 relative to stored map data. Map data may include roads and related data, such as buildings and/or parking areas, etc. To determine the location, the navigation device 60 may rely on information from a global navigation satellite system, distance data from sensors 40 attached to a drivetrain of the vehicle 25, a gyroscope, and/or an accelerometer. The map data may be stored locally, such as on the memory 74, or on the navigation device 60. Additionally or alternatively, the map data may be stored on a remote computer or network, accessible via the transceiver 50. Example navigation devices 60 include GPS (global positioning system) navigation devices, personal navigation devices, and automotive navigation systems.

The diagnostic port 65 is in communication with the computer 70 via the vehicle bus or network 22. The diagnostic port 65 provides a location for wired connection of the secondary computing device 80, such as a handheld vehicle diagnostic scan tool, to the vehicle bus or network 22. The design of the diagnostic port 65 may be defined in part by industry standards, such as an OBD-II port that uses Society of Automotive Engineering (SAE) standard J1962.

The computer 70 is a computing device that includes a processor 72 and a memory 74. The processor 72 is implemented via circuits, chips, or other electronic components. As such, the processor 72 may include one or more microcontrollers, one or more field programmable gate arrays (FPGAs), one or more application specific circuits (ASICs), one or more digital signal processors (DSPs), one or more custom integrated circuits, etc. The processor 72 is programmable to process the data and communications received via the memory 74, the keypad 35, the sensors 40, the power lock 45, the transceiver 50, the odometer 55, the navigation device 60, and the diagnostic port 65. Processing the data and communications may include processing to determine whether a keypad master code should be deactivated based at least on data received by or stored on the computer 70, and to deactivate the keypad master code in response to a determination that the keypad master code should be deactivated. The processor 72 commands the vehicle 25 components to actuate based on the data and communications, such as commanding actuation of the power lock 45 to an unlocked condition in response to receiving keypad data including the keypad master code while the keypad master code is activated.

The memory 74 is implemented via circuits, chips or other electronic components and can include one or more of read only memory (ROM), random access memory (RAM), flash memory, electrically programmable memory (EPROM), electrically programmable and erasable memory (EEPROM), an embedded MultiMediaCard (eMMC), a hard drive, or any volatile or non-volatile media etc. The memory 74 may store programming instructions for performing the processes described herein, and data collected from sensors and communications.

The computer 70, specifically the processor 72, may be programmed to determine whether a keypad master code should be deactivated based at least on data received by or stored on the computer 70, e.g., in the memory 74.

While the keypad master code is activated, the processor 72 may actuate the power lock 45 from being locked to being unlocked, such as the processor 72 sending a command signal to the power lock 45 to actuate the latch, in response to receiving keypad data, such as receiving a signal from the keypad 35 including the keypad data, indicating the keypad master code has been input by a user. Activating the keypad master code may include adding the master code to a list of authorized codes in a lookup table stored on the memory 74. The processor 72 may be programmed to actuate the power lock 45 in response to receiving keypad data that indicates buttons were pressed on the keypad that match any of the authorized codes in the lookup table.

While the keypad master code is deactivated, the processor 72 may refrain from actuating the power lock 45 from being locked to being unlocked in response to receiving keypad data indicating the keypad master code has been input by the user. Deactivating the keypad master code may include removing the master code from list of authorized codes in the lookup table. Deactivating the master code may include deleting the master code from the lookup table, as well as deleting any programming related to the master code.

The processor 72 may be programmed to identify a location of the vehicle 25, and to determine that the keypad master code should be deactivated based on the identified location.

The processor 72 may identify the location of the vehicle 25 based at least on data received from a sensor 40. For example, the processor 72 may receive a signal from the sensor 40, such as a signal from a GPS sensor, via the communications bus or network 22 that includes data indicating a latitude and longitude of the vehicle 25, and/or a signal from the navigation device 60 including data indicating a location of the vehicle 25 relative to the map data.

The processor 72 may determine that the keypad master code should be deactivated based at least on the identified location of the vehicle 25. The processor 72 may compare the identified location with information in a look up table. For example, the lookup table may contain data associating various locations, e.g., a certain GPS location or a certain location relative to the map data, with an indication of the whether the keypad master code should be activated or deactivated. GPS locations that are at a vehicle manufacturer facility, such as at an assembly plant, may be associated in the lookup table with the indication that the keypad master code should be activated. The lookup table may also associate certain locations, such a publicly accessible parking, with an indication that the keypad master code should be deactivated. When the identified location is associated with the indication that the keypad master code should be activated, the processor 72 may determine that the keypad master code should be activated. When the identified location is associated with the indication that the keypad master code should be deactivated, or when the identified location is not included in the lookup table, the computer 70 may determine that the keypad master code should be deactivated.

The processor 72 may be programmed to identify a distance driven by the vehicle 25, and to determine that the keypad master code should be deactivated based at least on the identified distance driven.

The processor 72 may identify the distance driven by the vehicle based on data received from the odometer 55 indicating the total number of miles (or kilometers) the vehicle 25 has driven since its initial manufacture. For example, the processor 72 may receive a signal from the odometer via the communications bus or network 22 that includes distance data indicating the distance driven by the vehicle 25 since its manufacture.

The processor 72 may determine that the keypad master code should deactivated based at least on the identified distance driven by the vehicle 25. For example, the processor 72 may be programmed to compare a threshold value, e.g. 15 miles, to the identified distance driven by the vehicle 25. When the identified distance driven by the vehicle 25 is at or below the threshold value the processor 72 may determine that the keypad master code should be activated by the processor 72. When the identified distance driven by the vehicle 25 is above the threshold value the processor 72 may determine that the keypad master code should be deactivated. The threshold value may be determined by a manufacturer of the vehicle 25, and programmed in the processor 72. For example, the manufacturer could set the threshold value based on an average, maximum, or minimum miles driven by vehicles during the manufacturing process, such as miles accrued by driving the vehicles from an assembly line to an on-site storage lot, driving to a vehicle transport such as a train car or semi-trailer, etc.

The processor 72 may be programmed to identify a mode of the vehicle 25, and to determine that the keypad master code should be deactivated based at least on the identified mode.

The mode of the vehicle 25 is a program profile of the processor 72 that defines how the vehicle 25 may operate, what controls and/or features may be accessible, what information is provided by the vehicle to the user, etc. For example, the processor 72 may be programmed to operate in different modes, such as a "factory" mode, a "transport" mode, and a "normal" mode, where the different modes enable and disable various vehicle 25 features. The factory mode may enable various diagnostic systems, such as those used by the manufacturer to test the vehicle 25 for quality control purposes. The transport mode may disable certain features, such as a tilt alarm/sensor system, that may interfere with efficient transport of the vehicle 25, such as via train or trailer. The normal mode may only allow access to features intended to be utilized by a consumer.

The mode of the vehicle 25 may be set based at least on an instruction received from a user device, sent to the computer via wired or wireless communication, in response to a user input to the user device, such as the processor 72 receiving a signal from the secondary computing device 80 including data indicating what mode the computer 70 should be in. The user device may be a remote device or an in-vehicle user interface. The remote user device may be the secondary computing device 80 in communication with the processor 72 via the transceiver 50 or the diagnostic port 65. The in-vehicle user device may be a human machine interface (HMI) 75 in communication with the processor 72 via the vehicle bus or network 22 and supported by an instrument panel of the vehicle 25. The mode may be set during the initial manufacture of the vehicle 25. The set mode may be stored in the memory 74.

The processor 72 may be programmed self-identify what mode it is in based at least on the set mode stored in the memory 74.

The processor 72 may determine that the keypad master code should deactivated based at least on the identified mode the vehicle 25. For example, the processor 72 may be programmed to compare the mode with information in a look up table. For example, the lookup table may contain data associating various modes, e.g., a "factory" mode or a "transport" mode, with an indication of the whether the keypad master code should be activated or deactivated.

The computer 70 is in electronic communication with one or more input devices for providing data to the processor 72 and one or more output devices for receiving data and/or instructions from the processor 72 e.g., to actuate an output device. Example input devices include: the keypad 35, the sensors 40, the transceiver 50, the odometer 55, the navigation device 60, the diagnostic port 65, the HMI 75, such as a switch or graphical user interface (GUI), etc., as well as other sensors and/or electronic control units (ECUs) that provide data to the computer 70, e.g., on the vehicle communications bus or network 22. Example output devices that may be actuated by the computer 70 include: HMIs 75, the power lock 45, etc.

The processor 72 may be programmed to receive keypad data. For example, the processor 72 may receive a signal from the keypad 35 including data identifying which of the buttons on the keypad 35 was pressed by a user.

The processor 72 may be programmed to actuate the power lock 45, for example by sending a command signal via the vehicle bus or network 22 to the actuator of the power lock 45 to move the latch to the first or second position. The command to actuate the power lock 45 may be sent in response to receiving keypad data that indicates buttons were pressed on the keypad 35 that match any of the authorized codes in the lookup table, as determined by a comparison of the keypad data with a list of authorized codes in a lookup table stored on the memory 74. For example, when the keypad master code is activated, the processor 72 may actuate the power lock 45 in response to receiving keypad data indicating that the keypad master code has been pressed.

The secondary computing device 80 includes a processor and memory, and may further include a transceiver (different from the transceiver 50 of the vehicle 25). The secondary computing device 80 is programmed to change the mode of the vehicle 25, such as by the secondary computing device 80 sending a signal to the processor 72 indicating that a user provided input to the secondary computing device 80 requesting the computer 70 operate in a certain mode. The secondary computing device 80 is in communication with the computer 70 of the vehicle 25, such as through the transceiver 50 and/or the diagnostic port 65. Example secondary computing devices 52 include smart phones, tablet computers, personal computers, and hand held vehicle diagnostic scan tools.

Process

Figure 3:
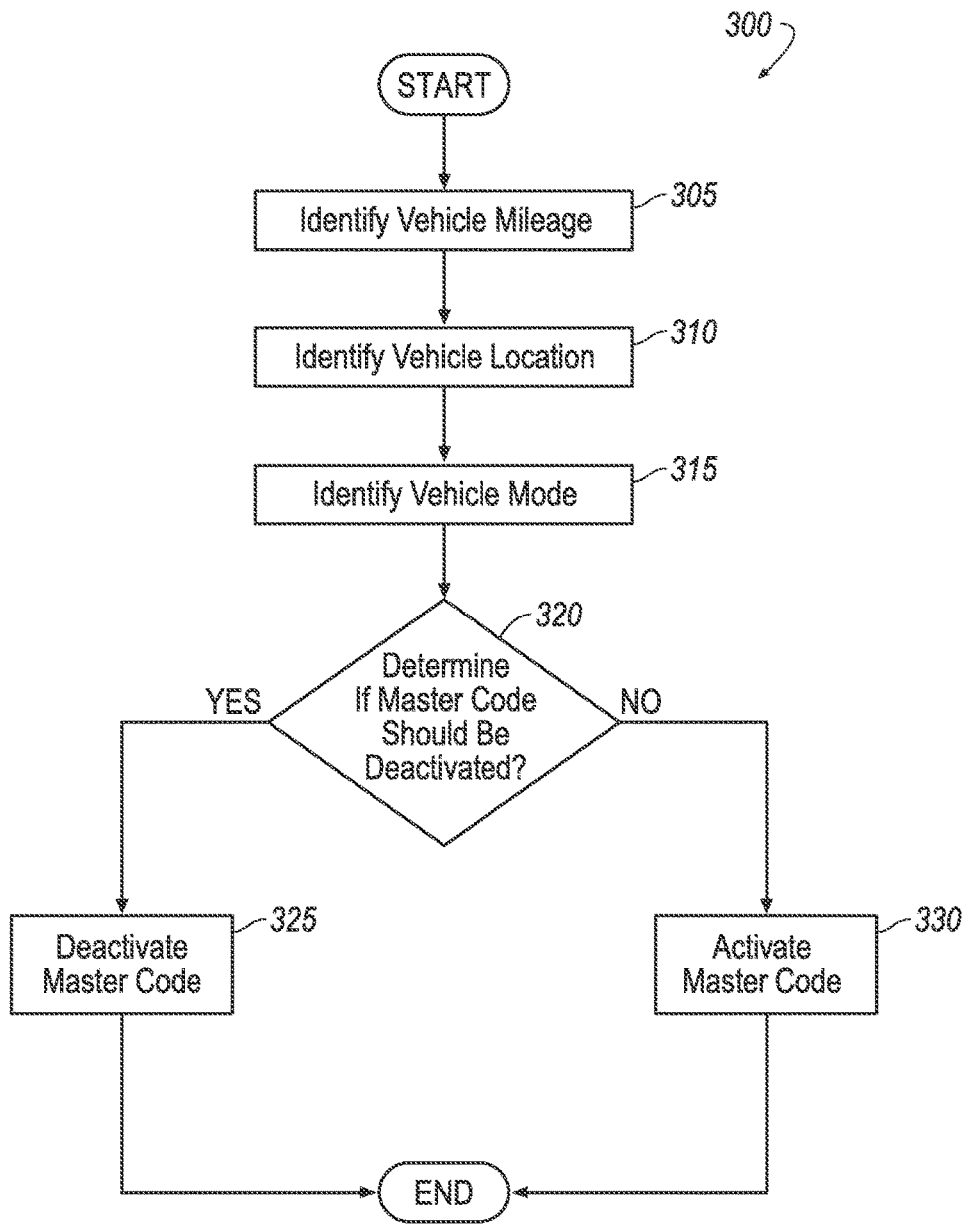
FIG. 3 illustrates a flow chart of an example process for keypad lock control.

Referring to FIG. 3, the process 300 may begin: as part of a power up or power down process of the vehicle 25; at timed intervals when power is supplied to the computer 70; or when the mode of the computer 70 is changed.

At a block 305, the processor 72 identifies a distance driven by the vehicle 25 since its initial manufacture, i.e., a total mileage of the vehicle. For example, the processor 72 may receive a signal from the odometer 55 including data indicating the number of miles (or kilometer) driven by the vehicle 25.

At a block 310, the processor 72 identifies a location of the vehicle 25. For example, the computer may receive a signal from the sensor 40, such as a signal from a GPS sensor, via the communications bus or network 22 that includes data indicating a latitude and longitude of the vehicle 25, and/or a signal from the navigation device 60 including data indicating a location of the vehicle 25 relative to the map data.

At the block 315, the processor 72 identifies a mode of the vehicle 25. The computer 70 may be programmed determine the mode of the vehicle 25 based at least on the set mode stored in the memory 74.

At the block 320, the processor 72 determines whether the master code should be deactivated based at least on data received by or stored on the computer 70. The data may be used by the processor 72 to determine whether the master code should be deactivated based at least on an identified location of the vehicle 25, such as by comparing the identified location with an indication that the keypad master code should be activated or deactivated in a look up table. The data may be used by the processor 72 to determine whether the master code should be deactivated based at least on distance driven by the vehicle 25, such as by comparing the identified distance to a threshold distance, e.g. 15 miles. For example, the manufacturer could set the threshold value based on an average, maximum, or minimum miles driven by vehicles during the manufacturing process, such as miles accrued by driving the vehicles from an assembly line to an on-site storage lot, driving to a vehicle transport such as a train car or semi-trailer, etc. The data may be used by the processor 72 to determine whether the master code should be deactivated based at least on a mode of the vehicle 25, such as comparing the mode with information in a look up table. When the processor 72 determines the master code should be deactivated, the process 300 moves to a block 325. Else, the process 300 moves to a block 330.

At the block 325, the processor 72 deactivates the keypad master code. For example, the processor 72 may remove the master code from list of authorized codes in the lookup table, or may delete the master code from the lookup table, as well as delete any programming related to the master code.

At the block 330, the processor 72 activates the keypad master code. For example, the processor 72 may add the master code to a list of authorized codes in the lookup table stored on the memory 74.

After executing the block 325 or 330, the process 300 ends. Alternatively, the process 300 may return to the block 305 to continue the process 300 in a looped manner until the computer 70 turns off.

Figure 4:
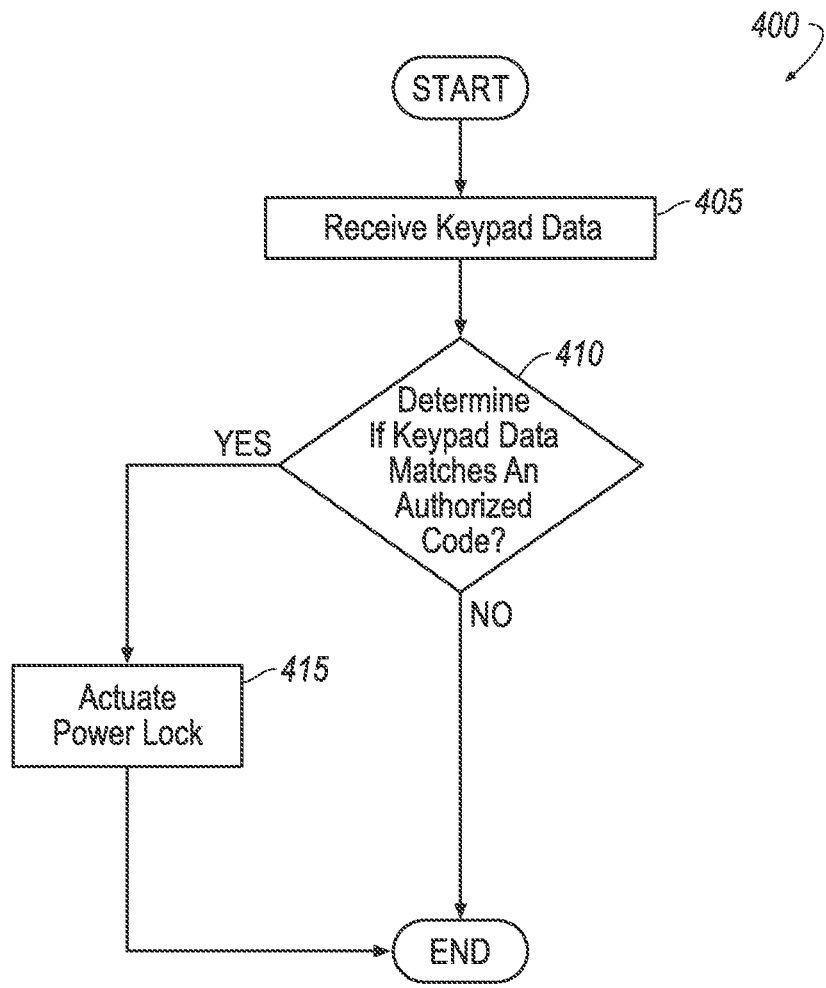
FIG. 4 illustrates a flow chart of another example process for keypad lock control.

Referring to FIG. 4, the process 400 may begin in response to a button being pressed on the keypad 35.

At a block 405 the processor 72 receives keypad data. For example, the computer 70 may receive a signal from the keypad including data identifying which of the buttons on the keypad 35 was pressed.

Next, at a block 410 the processor 72 determines whether the keypad data matches an authorized code. For example, the processor 72 may compare keypad data with a list of authorized codes in a lookup table stored on the memory 74. When the keypad data matches one of the authorized codes on the lookup table, the process moves to a block 415. Else the process ends.

At the block 415, the processor 72 actuates the power lock 45. For example, the processor 72 may send a command signal via the vehicle bus or network 22 to the actuator of the power lock 45 to move the latch to the unlocked position. After executing the block 415, the process 400 ends.

Conclusion

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A vehicle system comprising a computer programmed to:

determine whether a keypad master code should be deactivated based at least on data received by or stored on the computer; and deactivate the keypad master code in response to a determination that the keypad master code should be deactivated, wherein the keypad master code is a keypad code common to a plurality of vehicles, and wherein determining whether the keypad master code should be deactivated includes determining whether the keypad master code should be deactivated for one of the plurality of vehicles, wherein the computer is further programmed to determine a location of the one of the plurality of vehicles, compare the location of the one of the plurality of vehicles to an identified location, identify a distance driven by the one of the plurality of vehicles, and determine that the keypad master code should be deactivated based on the identified distance driven and as a result of determining that the one of the plurality of vehicles is at the identified location.

2. The vehicle system of claim 1, wherein the distance driven is identified based at least on data received from an odometer.

3. The vehicle system of claim 1, the computer further programmed to:
identify a mode of the one of the plurality of vehicles; and
wherein determining that the keypad master code should be deactivated is further based on the identified mode of the one of the plurality of vehicles.

4. The vehicle system of claim 3, wherein the identification of the mode of the one of the plurality of vehicles is based at least on a user input to a user device sent to the computer via wired or wireless communication, and the user device is one of a remote device or an in-vehicle user interface.

5. The vehicle system of claim 1, the computer further programmed to:
actuate a power lock to an unlocked condition in response to receiving keypad data including the keypad master code while the keypad master code is activated.

6. The vehicle system of claim 5, further comprising:
a keypad in communication with the computer; and
wherein the power lock is in communication with the computer.

7. The vehicle system of claim 1, wherein deactivating the master code includes deleting the master code.

8. The vehicle system of claim 1, further comprising a computer memory and wherein the keypad master code is one of a plurality of codes stored in the computer memory.

9. The vehicle system of claim 8, wherein deactivating the keypad master code for the one of the plurality of vehicles includes deleting the keypad master code from the computer memory.

10. The vehicle system of claim 9, wherein deactivating the keypad master code for the one of the plurality of vehicles includes retaining at least one of the plurality of codes, other than the keypad master code, in the computer memory.

11. A method comprising:
determining a location of one of a plurality of vehicles;
comparing the location of the one of the plurality of vehicles to an identified location;
identifying a distance driven by the one of the plurality of vehicles;
determining that a keypad master code should be deactivated for the one of the plurality of vehicles based on the identified distance driven and as a result of determining that the one of the plurality of vehicles is at the identified location; and
deactivating the keypad master code in response to determining that the keypad master code should be deactivated,
wherein the keypad master code is a keypad code common to the plurality of vehicles.

12. The method of claim 11, wherein the distance driven is identified based at least on data received from an odometer.

13. The method of claim 11, further comprising:
identifying a mode of the one of the plurality of vehicles; and
wherein determining that the keypad master code should be deactivated is further based on the identified mode of the vehicle.

14. The method of claim 13, wherein the identification of the mode of the one of the plurality of vehicles is based at least on a user input to a user device sent to the computer via wired or wireless communication, and the user device is one of a remote device or an in-vehicle user interface.

15. The method of claim 11, further comprising:
actuating a power lock to an unlocked condition in response to receiving keypad data including the keypad master code while the keypad master code is activated.

16. The method of claim 11, wherein deactivating the master code includes deleting the master code.

* * * * *